(12) United States Patent
Rrumbullaku et al.

(10) Patent No.: US 10,173,585 B1
(45) Date of Patent: Jan. 8, 2019

(54) DOOR OPENING INHIBITOR INTO ONCOMING TRAFFIC

(71) Applicant: GM GLOBAL TECHNOLOGY OPERATIONS LLC, Detroit, MI (US)

(72) Inventors: Besi Rrumbullaku, Rochester, MI (US); Phillip C. Storck, III, Chesterfield, MI (US); Jeffrey S. Hamminga, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/964,628

(22) Filed: Apr. 27, 2018

(51) Int. Cl.
*B60Q 1/00* (2006.01)
*B60Q 1/32* (2006.01)
*B60Q 9/00* (2006.01)
*B60Q 1/52* (2006.01)
*G01S 13/93* (2006.01)

(52) U.S. Cl.
CPC ............. *B60Q 1/323* (2013.01); *B60Q 1/525* (2013.01); *B60Q 9/007* (2013.01); *G01S 13/931* (2013.01); *G01S 2013/9314* (2013.01); *G01S 2013/9375* (2013.01)

(58) Field of Classification Search
None
See application file for complete search history.

(56) References Cited

U.S. PATENT DOCUMENTS

| 3,610,669 | A | * | 10/1971 | Morrissey, Sr. | ........ B60R 13/04 280/770 |
| 2011/0260848 | A1 | * | 10/2011 | Rodriguez Barros | ...................... B60Q 1/2665 340/438 |
| 2017/0028966 | A1 | * | 2/2017 | Elie | ........................ B60R 25/045 |
| 2017/0030128 | A1 | * | 2/2017 | Elie | ........................ E05F 15/42 |
| 2017/0030134 | A1 | * | 2/2017 | Elie | ........................ E05F 15/71 |
| 2017/0030135 | A1 | * | 2/2017 | Elie | ........................ E05F 15/41 |
| 2017/0030737 | A1 | * | 2/2017 | Elie | ........................ E05F 15/70 |
| 2017/0032599 | A1 | * | 2/2017 | Elie | ........................ G06F 3/005 |
| 2017/0210282 | A1 | * | 7/2017 | Rodriguez Barros | . G03B 21/00 |
| 2017/0218678 | A1 | * | 8/2017 | Kothari | ................... E05F 15/73 |

* cited by examiner

*Primary Examiner* — Julie Lieu

(57) ABSTRACT

A method for inhibiting a vehicle side door from opening into an oncoming traffic lane includes sending a remote door open command to the vehicle and detecting if a location of the transmitting device is greater than a predetermined distance from the vehicle to verify safe conditions to execute the command. If the transmitting device is determined to be at a location greater than a predetermined distance from the vehicle to verify safe conditions then GPS and on-board compass information is used to identify which vehicle doors should be inhibited from fully opening in the traffic lane to prevent causing damage to the vehicle.

16 Claims, 4 Drawing Sheets

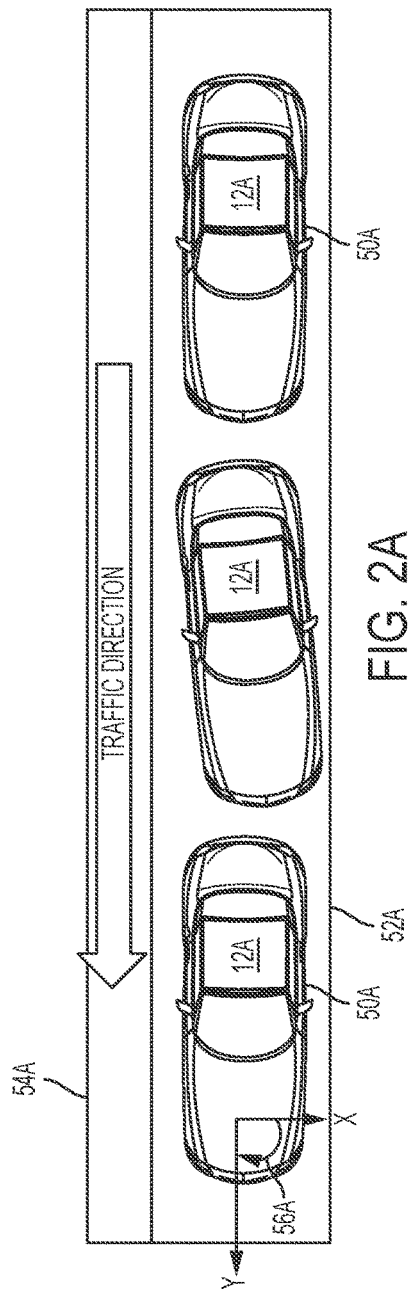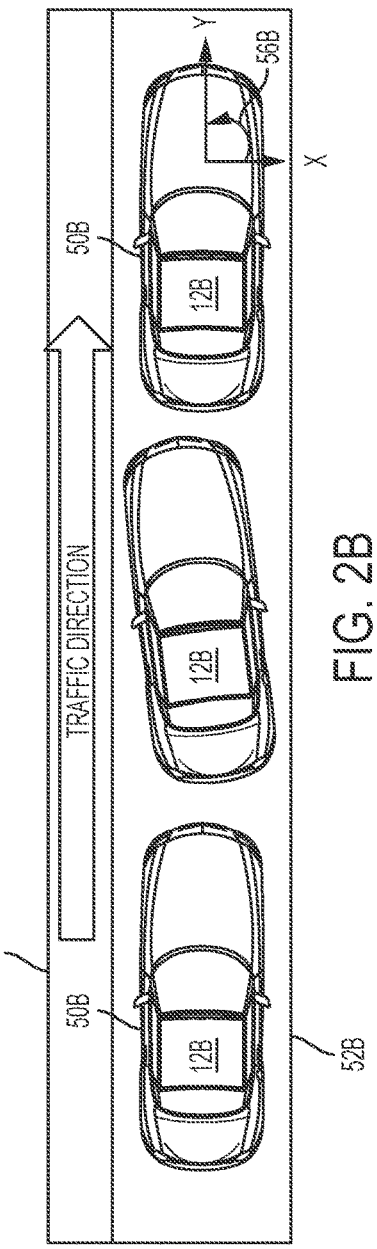

DOOR OPENING INHIBITOR INTO ONCOMING TRAFFIC

TECHNICAL FIELD

The present invention generally relates to motor vehicles, and more particularly relates to a method for inhibiting motor vehicle side doors from fully opening into an oncoming traffic lane.

BACKGROUND OF THE INVENTION

Many motor vehicles have motorized systems for opening one or more of the vehicle's side doors that swing open. These motorized systems may include features that are intended to detect obstacles in the opening path of the side doors while the side doors are being opened. However, these systems detect the obstacle by actually coming into physical contact with the obstacle. For example, a side door detects that an obstacle (e.g., another automobile, a person, etc.) is within its opening path when the side door contacts the obstacle. However, for power swinging side doors, there is a risk of the user initiating a door open event into oncoming traffic when a vehicle is parked.

Accordingly, it is desirable to provide a method for inhibiting a motor vehicle side door from swinging open into an oncoming traffic lane. Furthermore, other desirable features and characteristics of the present invention will become apparent from the subsequent detailed description and the appended claims, taken in conjunction with the accompanying drawings and the foregoing technical field and background.

SUMMARY OF THE INVENTION

One or more exemplary embodiments described herein provide a method for inhibiting vehicle side doors from opening into an oncoming traffic lane. In accordance with aspects of one exemplary embodiment, the method for inhibiting vehicle side doors from opening into an oncoming traffic lane includes sending a remote door open command from inside or outside of the vehicle from a transmitting device. And another aspect includes sending a local door open command from inside or outside of the vehicle from the transmitting device. Another aspect includes detecting if a location of the transmitting device is greater than a predetermined distance from the vehicle via a door control module. Yet another aspect includes preventing the identified vehicle doors from opening to full open during a manual opening from inside or outside of the vehicle. And another aspect includes determining a location and side of street that the vehicle is parked on based on GPS information collected by the door control module when the location of the transmitting device is greater than the predetermined distance. And yet another aspect includes providing a notification to a vehicle operator of an inhibited door due to traffic. And still another aspect includes combining compass information obtained by the door control module with the GPS information to identify which vehicle doors to inhibit from fully opening in response to the remote door open command. And still another aspect includes inhibiting the identified vehicle doors from fully opening based on preset features when the combined compass and GPS information indicates that the identified vehicle doors will open into the oncoming traffic lane.

A further aspect according to the exemplary embodiment includes opening at least one vehicle door to any position when the location of the transmitting device is not greater than the predetermined distance. Yet another aspect includes opening the identified vehicle door(s) a predetermined safe distance based on a first preset feature when the combined compass and GPS information indicates that the identified vehicle doors will open into the oncoming traffic lane. And still another aspect wherein the predetermined safe distance is 10 degrees.

Still another aspect according to the exemplary embodiment includes not executing the remote door open command based on a second preset feature when the combined compass and GPS information indicates that the identified vehicle doors will open into the oncoming traffic lane. And a further aspect wherein the compass information is obtained from an on-board compass. And one other aspect further includes using a vehicle camera to determine which side of the vehicle is adjacent the oncoming traffic lane.

The above features and advantages, and other features and advantages of the disclosure are readily apparent from the following detailed description when taken in connection with the accompanying drawings.

DESCRIPTION OF THE DRAWINGS

The present invention will hereinafter be described in conjunction with the following drawing figures, wherein like numerals denote like elements.

FIG. 2A illustrates how the method identifies that the passenger side door(s) need to be inhibited from fully opening into traffic as according to aspects of the exemplary embodiment;

FIG. 2B illustrates how the method identifies that the driver side door(s) need to be inhibited from fully opening into traffic as according to aspects of the exemplary embodiment;

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
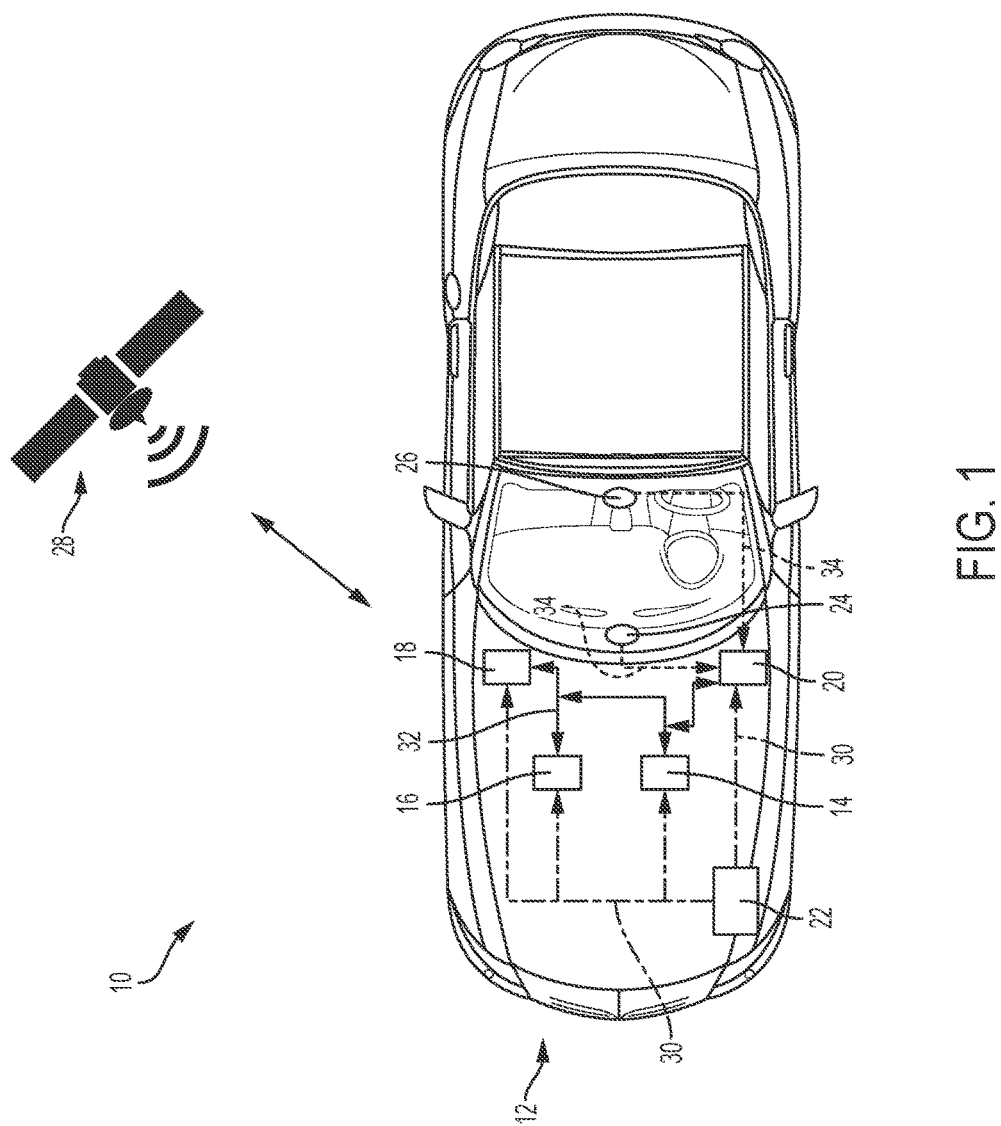
FIG. 1 illustrates a vehicle system configured for disclosing the method for inhibiting vehicle side doors from opening into an oncoming traffic lane as according aspects of an exemplary embodiment.

Referring now to the drawings, wherein the showings are for the purpose of illustrating certain exemplary embodiments only, and not for the purpose of limiting the same, FIG. 1 graphically illustrates a vehicle system 10 configured for disclosing the method for inhibiting motor vehicle side doors from fully opening into an oncoming traffic lane.

The system 10 includes a vehicle 12 having electronic control units (14, 16, 18, and 20) in electrical communication with a conventional 12-Volt battery 22. The system 10 also includes an on-board compass 24 and a front camera 26. In accordance with aspects of the exemplary embodiment, the on-board compass 24 is disposed proximate the vehicle dashboard and is operative to determine which direction the front end of the vehicle 12 is facing. In one embodiment, the front camera 26 is disposed on the rear view mirror (not shown) with its lens facing the interior surface of the windshield such that the field of view of the front camera 26 spans the windshield and may be used to identify which vehicle doors may be opened into an oncoming traffic lane. It is appreciated that other sensing systems, e.g., radar, LIDAR, may be included on the vehicle 12 for use in accordance with aspects of the exemplary embodiment for detecting various hazards on the road and/or in the environment surrounding the vehicle 12.

The control units include a body control module (BCM) 14, an engine control module (ECM) 16, a telematics module 18, and a door control module 20. The telematics module 18 is configured to manage exchange of information between the on-board controllers as well as for obtaining off-board information, such as GPS information, by wireless communication with a global satellite system 28. In accordance with aspects of the exemplary embodiment, the global satellite system 28 is operative to provide vehicle location information such as the street the vehicle is parallel parked on and which side of the street the vehicle is parked on. This information can be communicated from the telematics module 18 to the door control module 20 in accordance with one exemplary embodiment.

In accordance with the exemplary embodiment, the on-board compass 24 and the front camera 26 are also in communication with the door control module 20 which is configured for collecting and using data received from these devices and various other sensors. More particularly, the door control module 20 uses the on-board compass information and the GPS information to determine which side of the vehicle body is facing traffic when it is parallel parked. In response to a remote door open command when the user is unable to verify surroundings, the door control module 20 can obtain the GPS location of the vehicle as well as the on-board compass information to "identify" which side door(s) of the vehicle is facing a traffic lane. Based on user preset features, the door control module 20 can inhibit the "identified" side door(s) from fully opening, only permit unlocking the door(s), or to not execute the remote door open command at all. For example, the door control module 20 may be preset to inhibit the identified door(s) from fully opening but allow them to open a predetermined safe distance, e.g., 10 degrees from closed position.

Still referring to FIG. 1, the battery 22 is in electrical communication with the BCM 14, ECM 16, telematics module 18, and the door control module 20 through an assortment of electrical wires 30 for providing power to the control modules (14, 16, 18, and 20). The control modules (14, 16, 18, and 20) are also interconnected using one or more network connections, such as a communications network 32 which allows the control modules (14, 16, 18, and 20) to exchange information as necessary. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. The on-board compass 24 and front camera 26 are in signal communication with the door control module 20 through conductors 34 suitable for transferring the respective sensed information to the door control module 20.

Referring now to FIGS. 2A and 2B, illustrations of how the method identifies which side door(s) need to be inhibited from fully opening into traffic as according to aspects of the exemplary embodiment are provided. FIG. 2A shows three parallel parked vehicles 12A with the driver's side door(s) 50A facing the curb side 52A, and the passenger side door(s) facing into the oncoming traffic lane 54A. The method can identify which doors to inhibit from fully opening by combining the GPS information with the on-board compass information.

For example, the door control module 20 will use the GPS information to determine the street location, and which side of the street the vehicle is parallel parked on. Next, the door control module 20 will use the on-board compass information to determine which direction the front end of the vehicle 12 is facing. In this case, based on the GPS information the door control module determines that the driver side door(s) 50A is on the curb side 52A. Information received from the on-board compass 24 indicates to the door control module 20 that the front end of the vehicle 12A is 90 degrees in the clockwise direction 56A from the curb side 52A of the street. Thus, the door control module 20 would inhibit the passenger side door(s) from fully opening into the oncoming traffic lane side 54A. If the vehicle operator has selected a preset feature of the system then the identified side door(s) may be allowed to open a predetermined safe distance, may only allowed to be unlocked but remained closed, or the door control module 20 may be inhibited from executing the remote door open command completely. The door control module 20 includes an inhibit device (not shown) that is operative to limit the travel of the identified doors on the oncoming traffic side of the vehicle to a predetermined safe distance of travel, e.g., 5%-85% of travel from the closed position. The inhibit device may be a smart check link device or integrated hold open device.

With reference to FIG. 2B, three parallel parked vehicles 12B are shown with the driver side door(s) 50B facing the oncoming traffic lane side 54B while the passenger side door(s) is facing the curb side 52B of the street. In this case, based on the GPS information the door control module 20 determines that the driver side door(s) 50A is on the oncoming traffic lane side 54B. Information received from the on-board compass 24 indicates to the door control module 20 that the front end of the vehicle 12B is 90 degrees in the counter-clockwise direction 56B from the curb side 52B. Thus, the door control module 20 would inhibit the driver side door(s) from fully opening into the oncoming traffic lane side 54B. Likewise from above, if the vehicle operator has selected a preset feature, the identified side door(s) may be allowed to open a predetermined safe distance, only allowed to be unlocked but remained closed, or the door control module 20 may be inhibited from executing the remote door open command completely. The door control module 20 is additionally operable to provide a notification to a vehicle operator of an inhibited door due to traffic. The operator notification may include, but not limited to, e.g., a text message, an audible alert, a visual alert, or a haptic alert.

Figure 3:
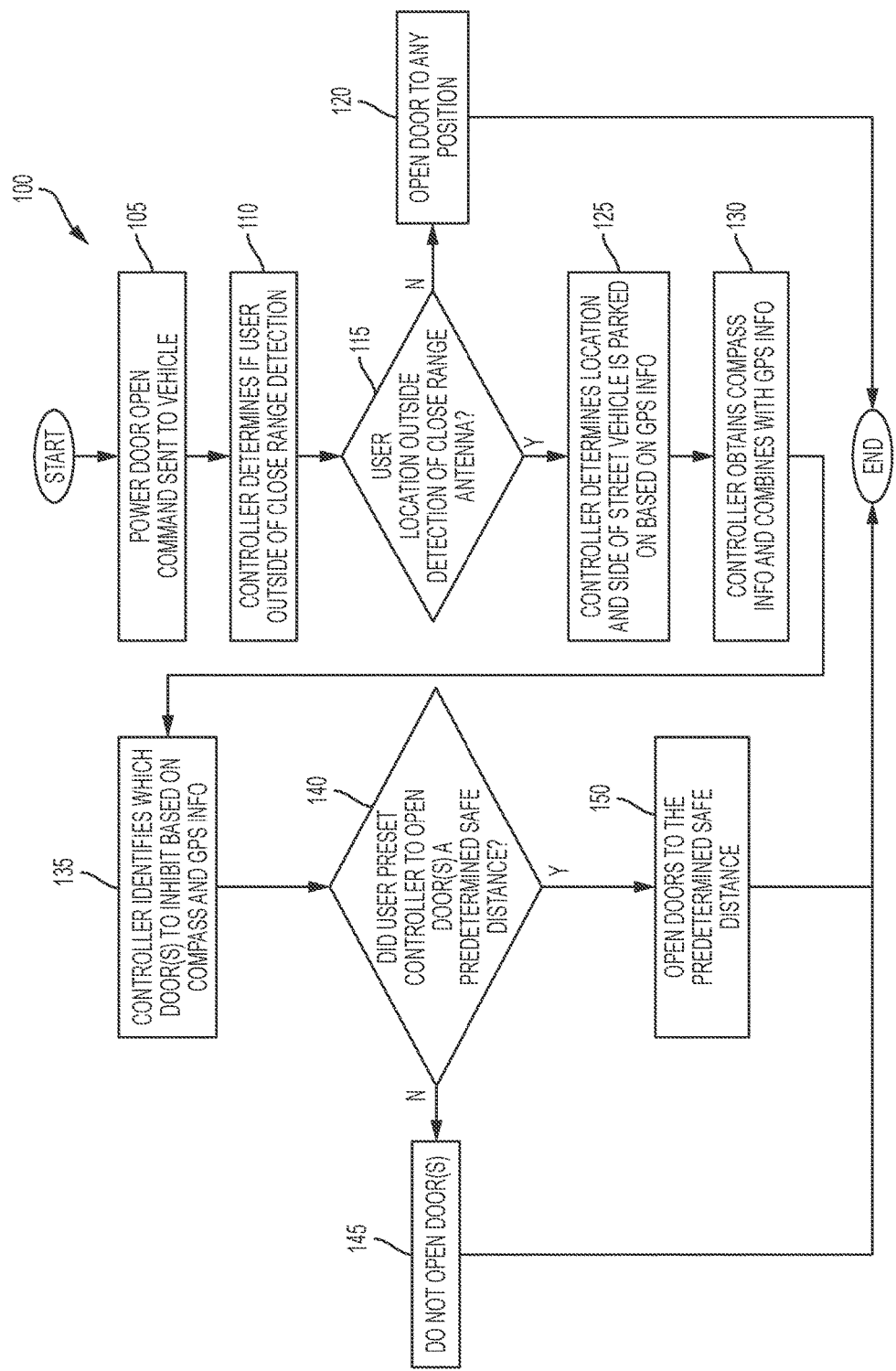
FIG. 3 illustrates an algorithm of the method for inhibiting vehicle side doors from opening into an oncoming traffic lane as according aspects of an exemplary embodiment.

FIG. 3 illustrates an algorithm 100 of the method for inhibiting vehicle side doors from opening into an oncoming traffic lane as according aspects of an exemplary embodiment. At block 105, the method begins with sending a power door open command to the vehicle. This door open command can be sent from a handheld transmitting device, such as a key fob, mobile phone, or other device suitable for such purpose. Next, at blocks 110 and 115, the door control module (or other on-board controller configured for such purpose) determines if the location of the transmitting device is greater than a predetermined distance from the vehicle such that it cannot be verified that it is safe to execute the door open command. If it is determined that the transmitting device is not at a location greater than a predetermined distance to verify that it is safe to execute the open door command then, at block 120, the vehicle door(s) may be opened to any position that the vehicle operator desires based on a selected preset feature.

If the transmitting device is at a location greater than a predetermined distance from the vehicle to verify that it is safe to execute the door open command then, at block 125, the door control module obtains GPS information to determine the street location and which side of the street the vehicle is parallel parked on. Next, at block 130, the method continues with obtaining on-board compass information to determine which direction the front end of the vehicle facing. Based on the GPS and on-board compass information, at block 135, the door control module identifies which doors should be inhibited from fully opening or if the door open command should be ignored to prevent causing any damage to the vehicle.

At block 140, the method determines if the vehicle operator has selected a preset feature to open the doors to a predetermined safe distance, e.g., 10 degrees from the closed position. If the vehicle operator not selected a preset feature to open the doors a predetermined safe distance then, at block 145, the identified door(s) may be allowed to be unlocked only but remained closed or the door open command may be entirely ignored. If the vehicle operator has selected the preset feature to open the identified side door(s) a predetermined safe distance then, at block 150, the door control module will execute the command to open the vehicle doors to the predetermined safe distance.

Figure 4:
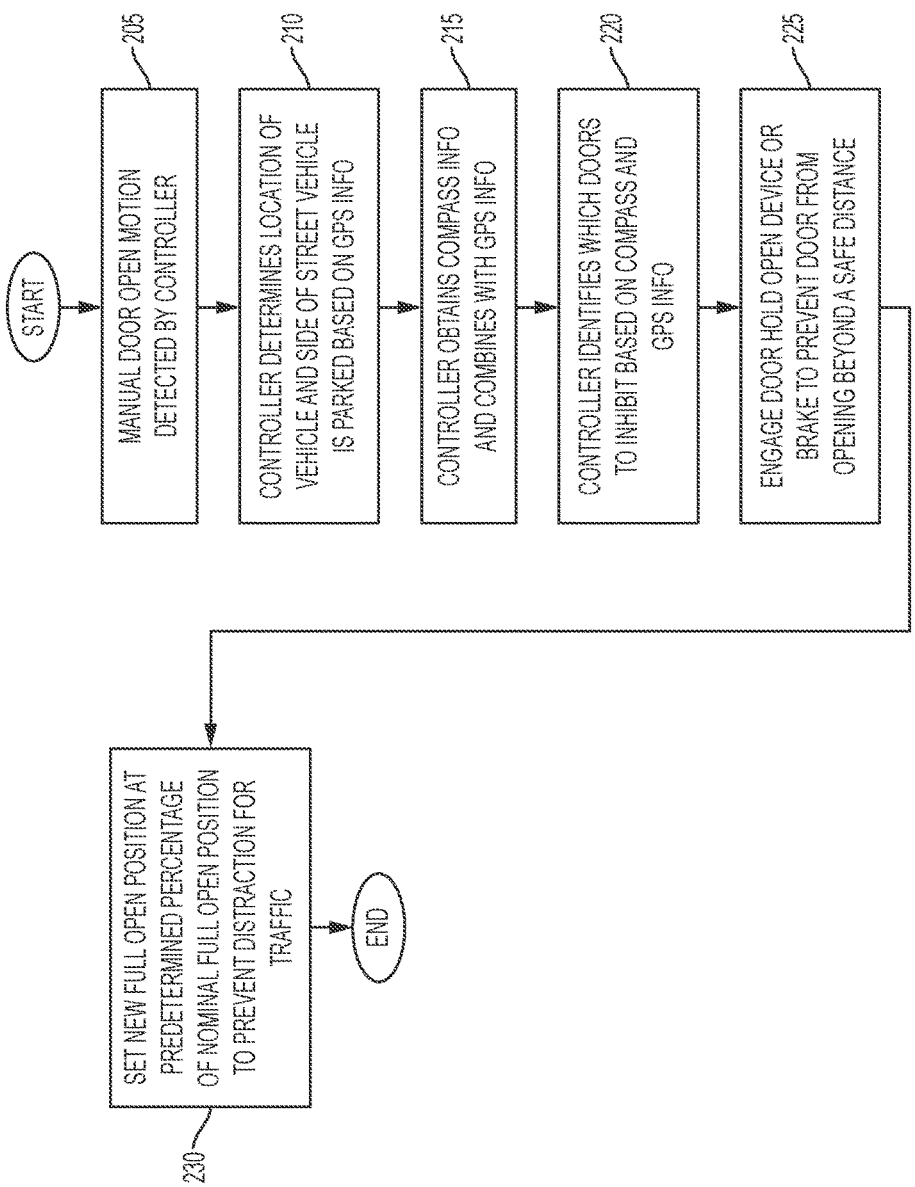
FIG. 4 illustrates an algorithm of a manual method for inhibiting vehicle side doors from opening into an oncoming traffic lane as according aspects of an exemplary embodiment.

Referring now to FIG. 4, an illustration of a manual method for inhibiting vehicle side doors from opening into an oncoming traffic lane as according aspects of an alternative exemplary embodiment is provided. The manual method begins at block 205 with using the door control module to detect the manual opening of the vehicle door. Next, at block 210, the method continues with determining the location of the vehicle and the side of the street the vehicle is parked on based on GPS information.

At block 215, the method continues with the door control module obtaining compass information from the on-board compass. Next, at block 225, the method continues with engaging the door hold open device or brake to the identified door(s) from opening beyond a safe distance. And, at block 230, the manual method ends with setting a new fully open door position to a predetermined percentage of a nominal fully open position to prevent distracting oncoming traffic.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for inhibiting a vehicle side door from opening into an oncoming traffic lane comprising:
   determining a location and side of street that the vehicle is parked on based on GPS information collected by a door control module when the location of a transmitting device is greater than a predetermined distance;
   combining compass information obtained by the door control module with the GPS information to identify which vehicle doors to inhibit from fully opening in response to a door open command; and
   inhibiting the identified vehicle doors from fully opening based on preset features when the combined compass and GPS information indicates that the identified vehicle doors will open into the oncoming traffic lane.

2. The method of claim 1 further comprising opening at least one vehicle door to any position when the location of the transmitting device is not greater than the predetermined distance.

3. The method of claim 1 further comprising opening the identified vehicle doors a predetermined safe distance based on a first preset feature when the combined compass and GPS information indicates that the identified vehicle doors will open into the oncoming traffic lane.

4. The method of claim 1 further comprising not executing the door open command based on a second preset feature when the combined compass and GPS information indicates that the identified vehicle doors will open into the oncoming traffic lane.

5. The method of claim 1 wherein the compass information is obtained from an on-board compass.

6. The method of claim 1 further comprising using a vehicle camera to determine which side of the vehicle is adjacent the oncoming traffic lane.

7. The method of claim 1 further comprising sending a remote door open command from inside or outside of the vehicle from the transmitting device.

8. The method of claim 1 further comprising sending a local door open command from inside or outside of the vehicle from the transmitting device.

9. The method of claim 1 further comprising detecting if a location of the transmitting device is greater than a predetermined distance from the vehicle via a door control module.

10. The method of claim 1 further comprising preventing the identified vehicle doors from opening to full open during a manual opening from inside or outside of the vehicle.

11. The method of claim 1 further comprising providing a notification to a vehicle operator of an inhibited door due to traffic.

12. A method for inhibiting a vehicle side door from opening into an oncoming traffic lane comprising:
   determining a location and side of street that the vehicle is parked on based on GPS information collected by a door control module when the location of a transmitting device is greater than a predetermined distance;
   combining compass information obtained by the door control module with the GPS information to identify which vehicle doors to inhibit from fully opening in response to the door open command;
   inhibiting the identified vehicle doors from fully opening based on preset features when the combined compass and GPS information indicates that the identified vehicle doors will open into the oncoming traffic lane; and
   opening the identified vehicle doors a predetermined safe distance based on a first preset feature when the combined compass and GPS information indicates that the identified vehicle doors will open into the oncoming traffic lane.

13. The method of claim 12 further comprising opening at least one vehicle door to any position when the location of the transmitting device is not greater than the predetermined distance.

14. The method of claim 12 further comprising not executing the remote door open command based on a second preset feature when the combined compass and GPS information indicates that the identified vehicle doors will open into the oncoming traffic lane.

15. The method of claim 12 wherein the compass information is obtained from an on-board compass.

16. The method of claim 12 further comprising using a vehicle camera to determine which side of the vehicle is adjacent the oncoming traffic lane.

* * * * *